United States Patent
Ewen et al.

(10) Patent No.: US 7,490,110 B2
(45) Date of Patent: Feb. 10, 2009

(54) PREDICTABLE QUERY EXECUTION THROUGH EARLY MATERIALIZATION

(75) Inventors: Stephan Eberhard Ewen, Stuttgart (DE); Holger Kache, San Jose, CA (US); Guy Maring Lohman, San Jose, CA (US); Volker Gerhard Markl, San Jose, CA (US); Vijayshankar Raman, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 11/388,934

(22) Filed: Mar. 24, 2006

(65) Prior Publication Data

US 2007/0226178 A1 Sep. 27, 2007

(51) Int. Cl.
*G06F 17/30* (2006.01)
(52) U.S. Cl. .................. 707/200; 707/204; 707/205
(58) Field of Classification Search .............. 707/200, 707/204, 205
See application file for complete search history.

(56) References Cited

U.S. PATENT DOCUMENTS

| | | | |
|---|---|---|---|
| 6,006,220 A | 12/1999 | Haderle et al. | |
| 6,026,390 A * | 2/2000 | Ross et al. | 707/2 |
| 6,339,769 B1 * | 1/2002 | Cochrane et al. | 707/2 |
| 6,366,903 B1 * | 4/2002 | Agrawal et al. | 707/2 |
| 6,477,525 B1 * | 11/2002 | Bello et al. | 707/3 |
| 6,510,422 B1 * | 1/2003 | Galindo-Legaria et al. | 707/2 |
| 6,513,029 B1 * | 1/2003 | Agrawal et al. | 707/2 |
| 6,526,403 B1 * | 2/2003 | Lin et al. | 707/4 |
| 6,799,202 B1 | 9/2004 | Hankinson et al. | |
| 6,807,546 B2 | 10/2004 | Young-Lai | |
| 6,983,291 B1 * | 1/2006 | Cochrane et al. | 707/200 |
| 6,990,503 B1 * | 1/2006 | Luo et al. | 707/200 |
| 7,191,169 B1 * | 3/2007 | Tao | 707/2 |
| 2002/0099689 A1 | 7/2002 | Bergman et al. | |
| 2004/0225639 A1 | 11/2004 | Jakobsson et al. | |
| 2005/0055381 A1 * | 3/2005 | Ganesh et al. | 707/200 |
| 2005/0065921 A1 | 3/2005 | Hrle et al. | |
| 2005/0097078 A1 | 5/2005 | Lohman et al. | |
| 2005/0267877 A1 | 12/2005 | Chaudhuri et al. | |
| 2005/0289098 A1 | 12/2005 | Barsness et al. | |
| 2006/0010170 A1 * | 1/2006 | Lashley et al. | 707/200 |
| 2006/0053178 A1 * | 3/2006 | van Ingen et al. | 707/204 |

(Continued)

OTHER PUBLICATIONS

Kabra et al., "Efficient Mid-Query Re-Optimization of Sub-Optimal Query Execution Plans", SIGMOD Conference 1998, ACM Digital Library, pp. 106-117.

(Continued)

*Primary Examiner*—Don Wong
*Assistant Examiner*—Kim T Nguyen
(74) *Attorney, Agent, or Firm*—Duke W. Yee; Doug H. Lefeve; Gerald H. Glanzman (57) ABSTRACT

A method for predictable query execution through early materialization is provided. The method deals with the problem of cardinality misestimation in query execution plans, by pre-executing sub-plans on a query execution plan that have questionable estimates and collecting statistics on the output of these sub-plans. If needed, the overall query execution plan is changed in light of these statistics, before optimizing and executing the remainder of the query.

30 Claims, 5 Drawing Sheets

U.S. PATENT DOCUMENTS

2006/0053181 A1* 3/2006 Anand et al. ............. 707/204
2006/0053182 A1* 3/2006 Sen et al. ............... 707/204
2006/0195416 A1 8/2006 Ewen et al.

OTHER PUBLICATIONS

Ng et al., "Dynamic Query Re-Optimization", Eleventh International Conference on Scientific and Statistical Database management, Aug. 1999, pp. 264-273.

Markl et al., "Robust Query Processing through Progressive Optimization", SIGMOD Conference 2004, ACM Digital Library, pp. 1-12.

Pedersen et al., "Query Optimization for OLAP-XML Federations", DOLAP'02, Nov. 2002, ACM Digital Library, pp. 57-64.

Yin et al., "Evaluation XML-Extended OLAP Queries Based on a Physical Algebra", DOLAP'04, Nov. 2004, ACM Digital Library, pp. 73-82.

Braumandl et al, "Quality of Service in an Information Economy", ACM Transactions on Internet Technology, vol. 3, No. 4, Nov. 2003, pp. 291-333.

* cited by examiner

PREDICTABLE QUERY EXECUTION THROUGH EARLY MATERIALIZATION

BACKGROUND OF THE INVENTION

1. Field of the Invention

The present invention relates generally to query optimization in database management systems. More specifically, the invention relates to the predictable query execution through early materialization.

2. Description of the Related Art

Traditionally, modern Database Management Systems (DBMSs) translate declarative Structured Query Language (SQL) statements into an executable plan prior to the actual execution of the query, hence strictly separating the plan selection and execution phases. A QEP is a functional program that is interpreted by the execution engine to produce the query result. A QEP outlines how the execution engine actually will run a specific query, i.e., how the data will be processed. For example, an important decision might be whether to use indexes and, if there are more indexes, which of these will be used. To achieve optimal performance, the translation phase employs an optimizer, which searches the space of all possible query execution plans (QEPs) for the optimal plan with respect to expected query execution cost. The optimizer, which is part of a compiler, needs to decide in which order to join the existing tables. To choose the optimal QEP, the compiler first compiles all the plans and then the optimizer needs to estimate the cost of each plan. The optimizer determines that a QEP is optimal based on a cost model. A cost model is a mathematical model that determines the execution cost of a query execution plan. Examples of execution costs of a query execution plan are commonly determined by I/O costs, CPU costs, and communication costs. This cost estimation procedure requires the accurate estimation of the intermediate result sizes, referred to as cardinalities, of each processing step. The estimation error in these cardinalities usually increases exponentially in the QEP, as cardinality estimates at one step are computed by multiplication of cardinality estimates at the earlier steps. Intermediate results are the results of a partial execution of a query execution plan. Intermediate results are communicated between the current query execution of the query execution plan and the next query re-optimization of the query execution plan. A partially executed query execution plan is a query execution plan that is executed up to a checkpoint within the query execution plan. A partially executed federated query execution plan is a federated query execution plan that is executed up to a checkpoint within the federated query execution plan.

For complex queries with a high number of tables and predicates, the cardinality estimation may be so far off from the truth, that the optimizer picks a highly sub-optimal, or inefficient, QEP, resulting in unnecessarily long query execution times. Even for only moderately complex queries, this situation occurs frequently when either parameter markers are used or the optimizer's estimation process makes assumptions about the underlying data that do not hold true. Prominent examples are the independence and uniformity assumptions that the optimizer employs, as long as no statistics are available that indicate the contrary. Statistics are numerical data that represent a measurement, or analysis, of the cost metric employed by the optimizer. Statistics represent information about, but are not limited to, table cardinalities, index cardinalities, column cardinalities, operator costs, CPU time, and IO time. For example, in the case of cardinalities, statistics tell the optimizer that one hundred rows of a table were expected to be used by the query execution plan at a certain point in the query execution plan.

Cost-based optimization of federated queries transparently extends optimization across data sources by introducing communication cost. Otherwise, cost-based optimization treats remote tables similar to local tables by introducing a source or server property that describes where the processing of the current plan operator happens. A special operator, called a SHIP operator, describes the point in the QEP where intermediate results are communicated between a remote data source and the federated DBMS. The statistics that are used to estimate cardinalities for remote tables are in most cases obtained from a remote data source, since the gathering of statistics on remote data is very expensive for the federated DBMS. Cardinality is a measure to count a number of rows. A cardinality estimate is an estimation of a number of rows. For example, the cardinality estimate of a CHECK point is the estimation of the number of rows at the CHECK point. The cardinality of an intermediate result is the number of rows in an intermediate result. The variety of relational DBMSs forming the remote data sources employ different optimizers and utilize different forms of statistics. Out of these, the federated DBMS can often exploit only the very basic statistics about the number of rows in a table. Exploiting statistics can be done in a variety of ways; for example, by querying an existing catalog at a remote data source, or by sampling data at a remote data source. The federated DBMS's optimizer is therefore not able to model data distribution and correlation in detail, as this would require distribution and multivariate statistics. The worst cases are federated queries that access non-relational remote data sources or remote DBMSs that do not employ a cost based optimizer. In those cases, there are no statistics on the remote data available at all, and the optimizer is forced to derive its cardinality estimates from default values.

Federated queries, therefore, quite frequently execute using a suboptimal QEP. For local parts of a federated query, the overall model of the data is, in most cases, fairly accurate, and the cardinality misestimates are caused by isolated predicates. For the federated part, however, misestimates can occur at virtually every point in the QEP in some cases. In comparison to purely local queries, the performance degradation, by means of absolute execution time through a suboptimal QEP, is higher for federated queries, because the remote data cannot be accessed natively, but only through a declarative, relational interface, which adds its own overhead.

The inadequacy of traditional query optimization for federated data systems has been recognized for a long time. One current approach provides for sites that are autonomous and can move data fragments independently; hence, no site has good global knowledge of data sizes or layouts. This approach adopts a hierarchical query optimization approach where sites sub-contract out query fragments to other sites via a bidding process that is done just before query execution begins. Other Federated DBMSs also provide calibration functions to help wrappers update their statistics periodically. However, all of these approaches are compile-time or just-before-execution approaches, and are therefore vulnerable to bad cardinality estimates.

More run-time solutions to adaptive query processing have been proposed for traditional, non-federated, DBMSs. Among the earliest was the work on choose-plan operators which pick one among multiple pre-chosen plans during query execution based on the value of run-time parameters. The disadvantage of this approach is that pre-choosing all possibly optimal plans leads to combinatorial explosion, whereas in methods like POP only one optimal plan needs to be maintained at any given time. In another current solution, multiple access methods are run competitively before one is picked. Another DBMS performs star-joins by first computing the intermediate results of all dimension table accesses, and uses the cardinality of these intermediate results to decide the join method for the star-join.

Mid-query re-optimization is a class of techniques in the prior art for changing a QEP during query execution. One current technique provides for re-optimizing after hash join operators by materializing their result, rewriting the SQL query to use this result, and invoking the optimizer again. Materializing means storing the results that are returned by a materialization point into temporary or permanent objects. A materialization point is a point during query execution at which results up to this point have to be processed entirely before query execution can continue. As an example, assume there is a query to join three pieces of information, a customer's account, a customer's transactions, and a customer's address, together. A partial execution of the query execution plan results in only the customer's account and address being joined when execution is stopped. This result, the joined account and address information, is saved as a temporary or permanent object, such as a table. A checkpoint is a point during query execution at which the processed amount of data is compared to the estimates made for query compilation. Yet another current technique called Query Scrambling also re-optimizes queries, but it focuses on handling delayed sources as opposed to incorrect cardinalities. Progressive Optimization (POP) is another instance of this family which monitors intermediate result cardinalities during execution and changes the QEP at well-defined checkpoints. Compared to the other mid-query re-optimization techniques, POP re-optimizes at a much larger number of points during query execution, such as, for example, above federated SHIP operators. POP is also more careful about cost-based reuse of intermediate results. However, POP has the drawback that it greedily re-optimizes as soon as one check-condition has been violated, lacking a global picture of the overall estimation errors in the query execution plan, which may lead to oscillations in the query execution plan and frequent re-optimizations, if many estimates in the query execution plan are incorrect.

LEO is another current technique for addressing cardinality misestimations, which uses query feedback to optimize future queries based on cardinality estimation errors observed during previous query executions.

A completely different approach to adaptive query processing is to view query processing as tuple routing, and to optimize routing of each tuple separately. In Telegraph, a separate Eddy operator is used to continually adapt the tuple routing among other operators. This mechanism is powerful and can be used to adapt join orders, to access paths, and to join algorithms, especially for wide area and Internet data sources. However, per-tuple routing does impose an overhead which can lead to performance regression when the initial plan does not change. Moreover, currently proposed Eddy routing policies are greedy policies; these are fine for certain interactive and continuous processing metrics, but it is not clear if any policy simpler than regular dynamic programming optimization will work for completion time or total work metrics.

There is, accordingly, a need for an improved method of predictable query execution in the presence of multiple estimation errors, which is a problem that very frequently occurs in federated databases where statistics about remote data sources are often imprecise. Exemplary embodiments of the present invention extend the POP technique to deal with multiple estimation errors, by performing a pre-computation of sub-plans of a query, whose statistics are deemed to be unreliable. The query is optimized, reusing the pre-computed results, only after reliable statistics have been established by executing sub-plans of the query. A sub-plan is part of a query that may be computed before any other part of the query is executed, and the intermediate results of the sub-plan do not depend on any other part of the query that has not already been executed.

SUMMARY OF THE INVENTION

The invention describes a computer implemented method, a computer program product, and a data processing system for query execution through materialization of intermediate results. A set of intermediate results for a set of sub-plans of a query execution plan is computed. The set of computed intermediate results is then materialized. Statistics about the set of materialized intermediate results are obtained. The query execution plan is optimized based on the statistics.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
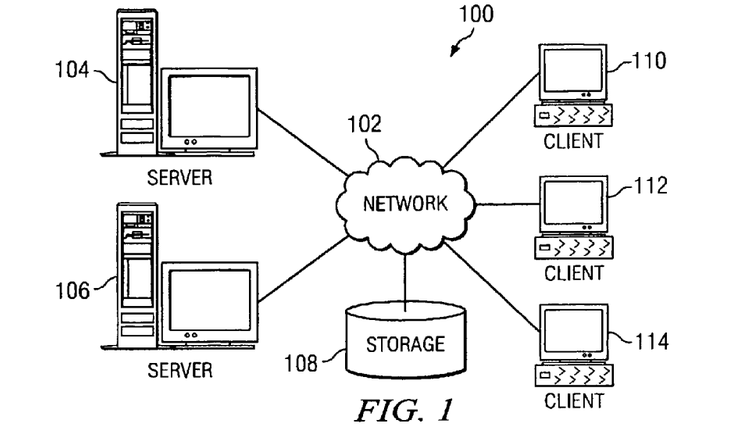
FIG. 1 is a pictorial representation of a network of data processing systems in which exemplary aspects of the present invention may be implemented.
Figure 2:
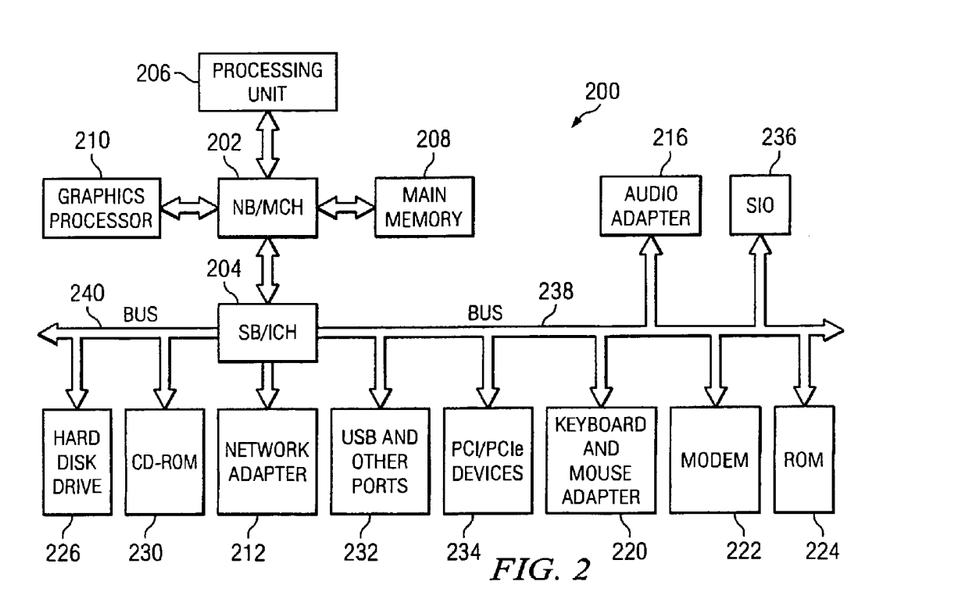
FIG. 2 is a block diagram of a data processing system in which exemplary aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
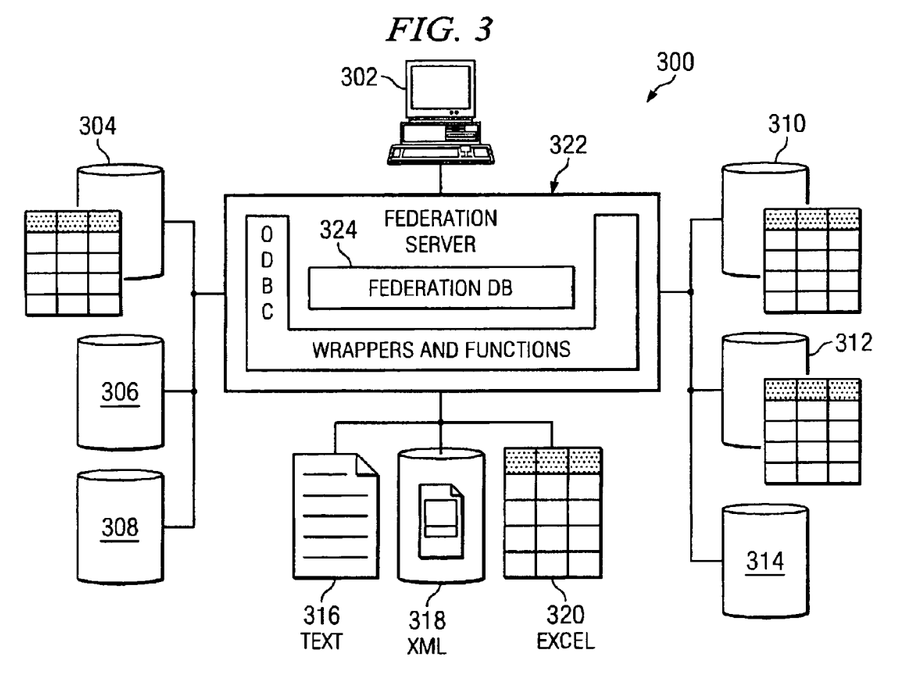
FIG. 3 is a block diagram of a federated data system in which exemplary aspects of the present invention may be implemented.

FIG. 3 is a block diagram of a federated data system in which exemplary aspects of the present invention may be implemented. A federated data system is a type of meta-database management system (DBMS) which transparently integrates multiple autonomous data sources into a single federated database. The constituent data sources are interconnected via a computer network, and may be geographically decentralized. Federated data system 300 includes federation server 322, which includes federation database (db) 324, data sources such as databases (dbs) 304, 306, 308, 310, 312, and 314, non-database sources such as XML tagged files such as XML 318, spreadsheets, such as Excel 320, text documents, such as text 316, and others. Client 302 accesses the federated database and the data sources. The data sources may be entirely relational or entirely non-relational or a combination of both relational and non-relational data sources. For example, databases 306, 308, and 314 might be relational data sources, while databases 304, 310, and 312 are non-relational data sources. Furthermore, the databases may be local, remote, or a combination of local and remote. Federation database 324 is a database that acts as a federated database, providing for the gathering of data from remote data sources.

A federated data system allows a user to join data from local tables and remote data sources, as if all the data is local. Furthermore, a federated data system allows a user to take advantage of the data source processing strengths by sending distributed requests to the data sources for processing. A federated data system can compensate for SQL limitations at the data source by processing parts of a distributed request at the federated server. With a federated data system, a user may send distributed requests to multiple data sources within a single SQL statement. For example, the user may join data that is located in a DB2 Universal Database™ table, an Oracle table, and a Sybase view in a single SQL statement.

Typically, a federated data system data source is a relational DBMS instance, such as Oracle or Sybase, and one or more databases that are supported by the instance. The data sources are semi-autonomous. For example, the federated server can send queries to a data source at the same time that a local application accesses the data source. Federated data systems are comprised of both local and remote data sources as well as both relational and non-relational data sources.

To end users and client applications, data sources appear as a single collective database. Users and applications interface with the federated database managed by the federated server. The federated database contains catalog entries that identify data sources and their characteristics. The federated server consults the information stored in the federated database system catalog and the data source wrapper to determine the best plan for processing SQL statements. In the present example, federation server 322 is depicted as including an Open DataBase Connectivity source wrapper.

Early Materialization

Progressive optimization (POP) is a technique used to re-optimize a query in mid-flight. POP has been extended to work in a federated DBMS scenario. POP judiciously places checkpoints at intermediate processing stages in a query execution plan. Each checkpoint has an optimality condition, which defines under which circumstances the QEP is optimal. An optimality condition might be a range of cardinalities, with the meaning that the QEP is optimal as long as the cardinality, the intermediate result size, at this checkpoint is within the specified range. POP triggers re-optimization whenever the optimality condition at a checkpoint is violated.

One important optimality condition is a validity range for the cardinality of an intermediate result. Cardinality estimates are a major component of a cost-based optimizer, and therefore ranges may be easily determined during cost-based optimization. Moreover, cardinalities may be easily counted at runtime, and thus the optimality condition may be easily verified at runtime by checking whether the actual cardinality is in the validity range. Other possible parameters for defining an optimality condition are elapsed time, communication cost, or memory use.

Federated DBMS often cannot provide good cardinality estimates to the federated query optimizer, due to lack of proper statistics at the remote source. Similarly, estimates for other parameters such as elapsed time, communication cost, or memory use are often imprecise. In such cases, the query execution plan determined by the cost based optimizer often may not be optimal. Therefore, checkpoints may often trigger re-optimization after executing a remote sub-plan of a federated query as soon as the intermediate result of a remote sub-plan is transferred to the federated server because the validity ranges of the sub-plans will very frequently be violated. A sub-plan is part of a query that may be computed before any other part of the query is executed because the intermediate results of the sub-plan do not depend on any other part of the query that has not already been executed. A query may be comprised of one or more sets of sub-plans, wherein each set of sub-plans is comprised of one or more sub-plans. Therefore, a set of sub-plans comprises one or more sub-plans. Each sub-plan in the set of sub-plans will have an intermediate result, so that a set of sub-plans will generate a corresponding set of one or more intermediate results. Note that throughout the application, the term SHIP is used to denote the operator that transfers to/materializes at the federated server the intermediate result of a remote sub-plan processed at a remote data source.

Using techniques like POP for running a query with several severe cardinality misestimations imposes a high optimization overhead on the query, and may, in some cases, cause many oscillations between bad, sub-optimal plans. This may result in a query performance worse than a query performance without using re-optimization techniques. The reason for this is that a single re-optimization adds knowledge only to the point where it has been triggered. Comparing unreliable estimates with hard facts leads the optimizer into a heavy plan bias because the estimates tend to differ from actual cardinalities in a particular direction, typically towards cardinality under-estimation. The problem of optimizing for a best plan with knowledge of different quality has not yet been solved.

Exemplary embodiments of the present invention provide a solution to the problem of re-optimizing queries with multiple estimation errors in the QEP, by gathering more knowledge before re-optimization, more evenly distributed over the plan. The overall idea is to pre-execute and materialize the partial results from each sub-plan with questionable estimates a priori and to collect statistics on each of these partial results, before optimizing and executing the remainder of the query. This allows the remainder of the query to be optimized. Early materialization is a query optimization rule that can be applied to federated and non-federated queries. It locates uncorrelated sub-plans in a query execution plan and moves the execution of these sub-plans up in the query execution plan. This guarantees that all uncorrelated sub-plans are executed first in a top-down processed query execution plan and gives the opportunity to interrupt query execution after all the uncorrelated sub-plans have been executed. Because results would be lost at the time the query is interrupted, the results are materialized into temporary objects to be retained. Once the query execution plan has been optimized, the optimizer reviews all the plans in light of the actual knowledge and determines if there is a cheaper plan considering the cost of materializing any new intermediate results.

For non-federated data systems, the sub-plans to pre-execute could be determined using heuristics, or using a statistical model to determine if the expected size of a materialized intermediate result meets a policy. A policy is a set of rules that determines when the materialized intermediate result may be used. An example of a rule is that if the estimated size of a materialized intermediate result exceeds a defined threshold, then the materialized result cannot be used. A heuristic is a process to determine a solution based on a set of rules. A heuristic could describe, for example, that only sub-plans that have at least one join predicate or a selectivity predicate should be used. These predicates can potentially filter out many rows from the accessed objects and estimated statistics have a low reliability. A statistical model for checking estimation errors may be, for example, if the estimates fall short of a threshold by a certain percentage. For federated queries, sub-plans to pre-execute naturally may be the sub-plans executed at remote data sources with inaccurate statistics. That is, for a federated query, the intermediate results from each remote data source are pre-computed prior to the execution of the remainder of the query that combines all remote source results in the federated server. After this materialization of all remote sub-plans, re-optimization is considered based on the violation of at least one validity range. This re-optimization will change the remainder of the query execution plan that combines all remote source results in the federated server, if any validity range is violated.

Through this mechanism, the selective optimization of the remainder of the query execution plan is aware of the actual cardinalities, and possibly even further statistical parameters such as data distribution, memory usage, and usage cost, for example, of all remote sub-plans, and may directly come up with a very good plan, reducing the required re-optimizations due to missing statistics to a single re-optimization, as will be discussed below with reference to FIG. 4. Subsequent re-optimizations, or selective optimizations, may occur in the spirit of POP, to compensate for correlations that involve a join predicate for a local join. As an additional impact, this approach adds the knowledge evenly to multiple parts of the plan rather than to an isolated point only, consequently preventing the optimizer from falling into a plan bias, because comparison between result sizes is done for all questionable estimates (remote sub-plans) equally on the basis of actual knowledge. The only side effect of performing the materialization up front is that the temporary storage space, which is used for temporary tables, sorted results, and hash-tables, is occupied for a longer time.

Realizing early materialization is straightforward in an exemplary embodiment of the invention using Do-At-Open (DAO) plans. In this case, the optimizer initially optimizes the query, and builds so-called DAO plans for each questionable estimate, also known as a remote sub-plan of a federated query. DAO plans are evaluated prior to the execution of the remainder of the query. If the DAO plan evaluates to true, the sub plan of the operator that the DAO plan maps to is executed; otherwise, the sub plan is skipped. SHIPS are early materialized by inserting a dummy operator, such as a FILTER, for example, along with a dummy predicate, which always evaluates to true, at the top of the QEP, and creating a DAO map for every SHIP operator. The materialized result is then accessed in the same way as the client of a common sub expression. FIG. 4 illustrates this principle.

Figure 4:
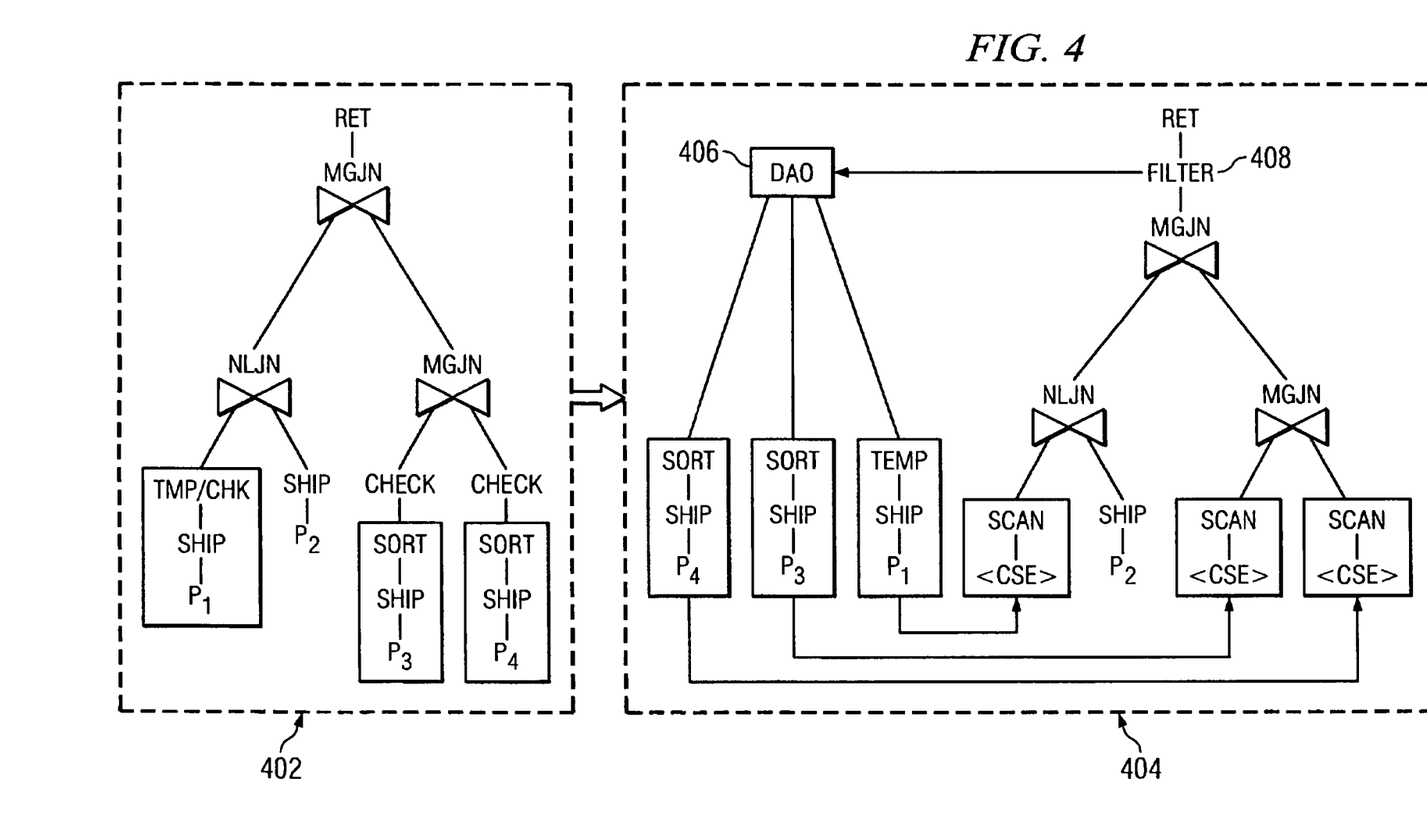
FIG. 4 is a diagram that schematically illustrates early materialization realized through Do-At-Open (DAO) plan maps, in accordance with an exemplary embodiment of the present invention.

FIG. 4 is a diagram that schematically illustrates early materialization realized through Do-At-Open (DAO) plan maps, in accordance with an exemplary embodiment of the present invention. The left side, plan 402, shows a plan that, according to traditional re-optimization, requires three re-optimizations to add the knowledge about the three remote accesses, $P_1$, $P_3$, and $P_4$. The plan, plan 404, on the right side of FIG. 4, shows how early materialization reduces the amount of re-optimizations needed to gain the necessary knowledge to a single re-optimization. Plan 404 shows early materialization realized through a DAO plan map. In plan 404 a dummy operator, Filter 408, has been inserted between the return and the merge join (MGJN). Filter 408 always evaluates to true and triggers DAO 406 to execute, which early materializes the three remote accesses, $P_1$, $P_3$, and $P_4$. The SHIP operators are materialized in the DAO plan map of the dummy FILTER and are accessed normally thereafter. Correlated SHIPs are excluded from early materialization.

A second strategy for realizing early materialization is to directly modify the executable plan, if it is available, in the form of executable or interpretable code. The code consists of a series of threads, each of which describes a pipeline. Reordering the series in which the threads are invoked, such that the threads that read from the SHIPs and write into the next TEMP, SORT or Hash Table are executed first, will model the reordering of the sub plans very naturally, but may cause problems with the complex environment of code optimization and processing. The reordering is conceptually transferable to nested iterators.

For gravely underestimated cardinalities, left deep join trees of nested-loop-joins are chosen commonly, resulting in all except one SHIP operator being correlated. This scenario voids the benefits of the early materialization strategy, as only a single uncorrelated SHIP remains. Materialization of correlated SHIP operators is very expensive and impracticable. In practice, however, the majority of the correlated SHIPs contain a series of uncorrelated predicates, so that their uncorrelated part can be practically materialized. This is applicable when the re-optimization is expected to turn the correlated SHIP operators into uncorrelated ones, which frequently occurs when the uncorrelated SHIPs are underestimated and exceed their upper validity range. Therefore, violation of all upper validity range bounds may be employed as a trigger to materialize partially correlated SHIPs, as shown in FIG. 5.

Figure 5:
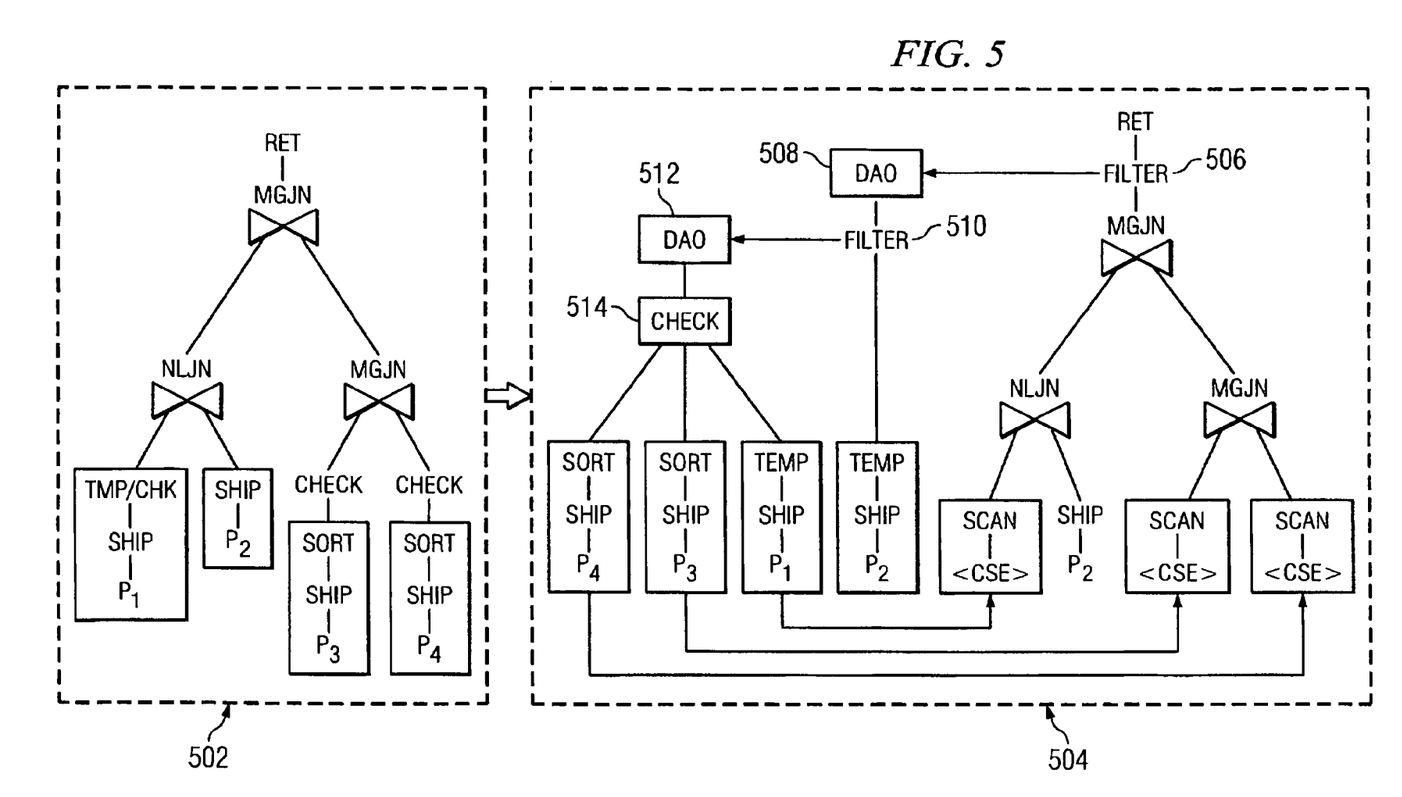
FIG. 5 is a diagram that schematically illustrates the early materialization of partly correlated SHIP operators, in accordance with an exemplary embodiment of the present invention.

FIG. 5 is a diagram illustrating the early materialization of partly correlated SHIP operators, in accordance with an exemplary embodiment of the present invention. The plan on the left side of FIG. 5, plan 502, shows a QEP that has three partly correlated SHIP operators $P_1$, $P_3$, and $P_4$ and one uncorrelated SHIP, $P_2$. The plan, plan 504, on the right side of FIG. 5, shows the same QEP after applying a DAO plan with a nested DAO plan to handle both partly correlated and uncorrelated SHIP operators. A dummy operator, filter 506, is inserted in the QEP between the return and the MGJN, which evaluates to true and triggers DAO 508. DAO 508 has a FILTER operator, Filter 510, which causes DAO 512 to be executed. DAO 512 contains CHECK operator, Check 514. The materializing of the partly correlated SHIP operators is dependent on violation of the uncorrelated SHIPs' validity range. The CHECK operator, Check 514, causes the DAO plan, DAO 512, to evaluate to true, if the SHIPs' validity ranges are violated. The sub plan of the DAO-Filter is then invoked and materializes the uncorrelated portion of the partially correlated SHIPS. The NLJN on the right side does not access the materialized result $P_2$, because if $P_2$ is materialized, a re-optimization is already guaranteed.

Figure 6:
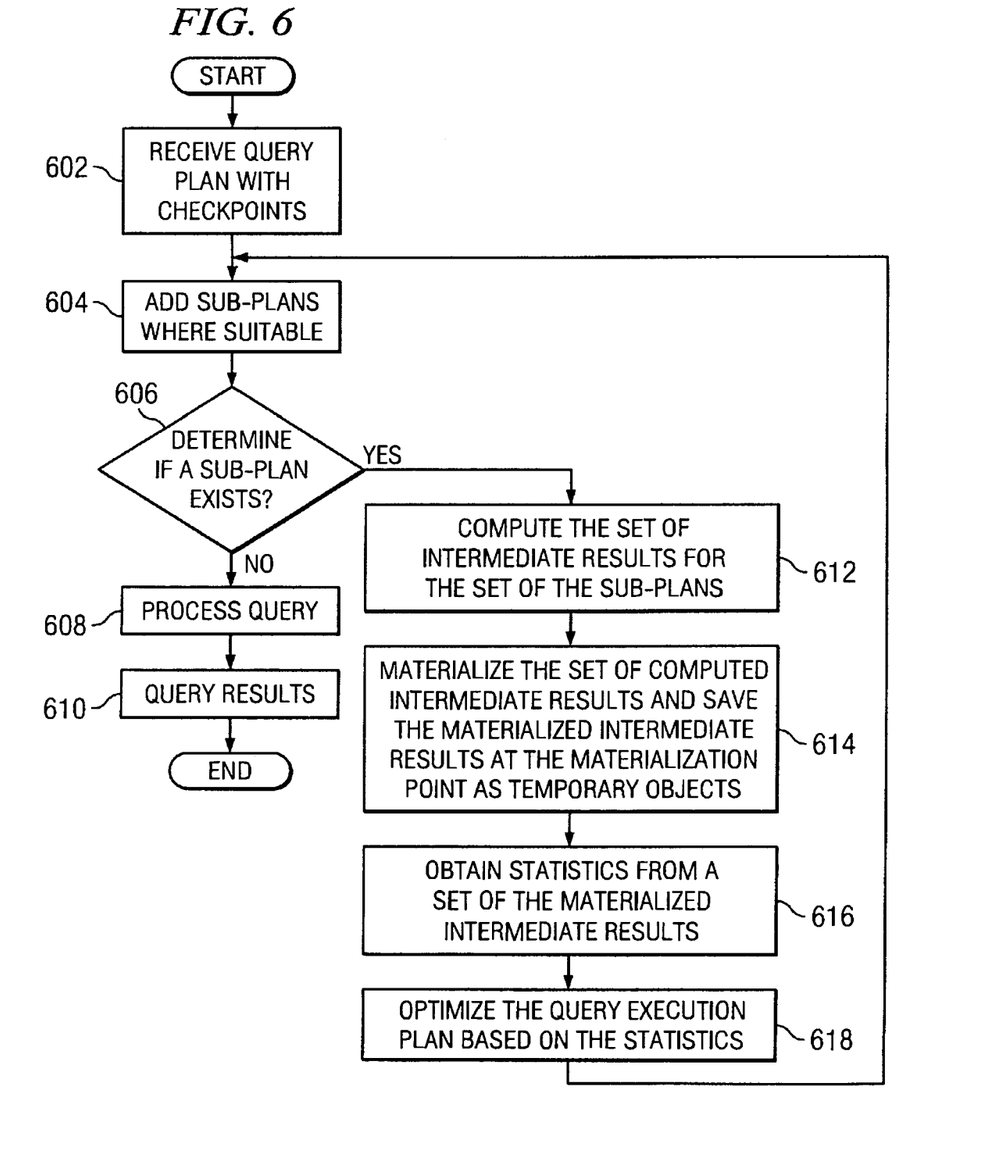
FIG. 6 is a flowchart illustrating the operation of query execution with Progressive Optimization and early materialization, in accordance with an exemplary embodiment of the present invention.

FIG. 6 is a flowchart illustrating the operation of query execution with Progressive Optimization and early materialization, in accordance with an exemplary embodiment of the present invention. The operation begins when a query execution plan with checkpoints is received (step 602). The query may be compiled through the use of any method that adds checkpoints to a query. A checkpoint is a point during query execution at which the processed amount of data is compared to the estimates made for query compilation. Next, the operation adds sub-plans, where suitable (step 604). A sub-plan is part of a query execution plan, below a materialization point, that is able to be early materialized by computing the intermediate results of that sub-plan. A materialization point is a point during query execution at which results up to this point have to be processed entirely before query execution can continue. When a sub-plan is compiled, it forms a pre-query. A pre-query may be processed, that is, pre-computed, before any other part of the query is processed, and the results of the pre-query do not depend on any other part of the query that has not already been executed.

Next, the operation determines if a sub-plan exists (step 606). If a sub-plan does not exist (a no output to step 606), then the operation processes the query (step 608), gets the query results (step 610), and ends. If a sub-plan does exist (a yes output to step 606), then the operation computes the intermediate results of the sub-plan (step 612). Next, the operation materializes the intermediate results and saves the materialized intermediate results at the materialization point as temporary objects (step 614). Saving results at a materialization point means storing the results available at the materialization point. Next, the operation obtains statistics for the materialized intermediate results (step 616). Such statistics may include, for example, the size of the intermediate result, the number of rows in the intermediate result, the amount of memory used by the intermediate result, and so on. Statistics for the materialized results represent the amount of data, or any other measure used in the cost model of a query optimizer for the materialization. Statistics indicate whether a given estimate of a cost falls short of a threshold by a certain percentage. The operation then re-optimizes the query (step 618). Re-optimizing a query is the process of compiling, or recompiling, the query using the newly obtained statistics for the materialization point. The optimization process exploits the materialized intermediate results materialized based on cost. Exploiting materialized results is the process of searching through the complete set of materialized results and finding the materialized result that fits at a given point in the plan. Afterwards, the operation returns to step 604 and adds sub-plans where suitable. Compiling means to use a computer program to translate source code written in a particular programming language into computer-readable machine code that can be executed. Recompiling means to compile the code again.

Early materialization does not directly imply any additional materialization, only performing the materialization that POP performs anyway a priori. To reduce overhead, a staging between sensitive and robust spots is easily introduced in a similar fashion as for correlated SHIPs.

In the presence of certain constructs, early materialization runs the risk of executing overeagerly accessing rows. Do-At-Open plans, Early Out conditions, and Fetch-First-N-Rows clauses need to be treated with special care to prevent early materialization from voiding the benefits of these constructs.

The concept of early materialization is not limited to federated query execution plans, but may also be applied to local queries to obtain actual knowledge about cardinalities earlier, and to support more efficient re-optimization. Eager materialization, as is beneficial for federated queries, might not be desirable for local queries, but any naturally occurring materialization can be executed a priori. For local queries, this would result in early hash-table building, early sorting, etc. Because the cost for obtaining the knowledge earlier is only a longer occupation of the DBMS's temporary storage space and does not impact the query's performance, early materialization is a useful addition for any mid-query re-optimization technique. Early materialization may be used for pre-queries retrieving data from any kind of relational object including tables, indexes, nicknames, views, and MQTs (materialized query table).

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product for query execution through materialization of intermediate results, the computer program product comprising:

a computer usable medium having computer usable program code tangibly embodied thereon, the computer usable program code comprising:

computer usable program code for identifying a set of sub-plans of a query execution plan prior to execution of the query execution plan, wherein each sub-plan of the set of sub-plans comprises a portion of the query execution plan for which an intermediate result of the sub-plan does not depend on other parts of the query execution plan that have not already been executed;

computer usable program code for computing the set of sub-plans prior to execution of the query execution plan and prior to the computation of the other parts of the query execution plan, wherein computing the set of sub-plans comprises:

computer usable program code for computing a set of intermediate results for the set of sub-plans to form a set of computed intermediate results;

computer usable program code for materializing the set of the computed intermediate results to form a set of materialized computed intermediate results;

computer usable program code for storing the set of materialized computed intermediate results;

computer usable program code for obtaining statistics from the set of the computed materialized intermediate results; and computer usable program code for determining, based on the statistics, which materialized computed intermediate results of the set of materialized computed intermediate results are useable to optimize the query execution plan for cost, to form useable materialized computed intermediate results; and computer usable program code for optimizing the query execution plan for cost using the useable materialized computed intermediate results to form an optimized query execution plan.

2. The computer program product of claim 1, further comprising:

computer usable program code for executing the optimized query execution plan.

3. The computer program product of claim 1, wherein the computer usable program code for optimizing the query execution plan for cost using the useable materialized computed intermediate results to form an optimized query execution plan exploits the set of materialized intermediate results based on a cost model.

4. The computer program product of claim 1, wherein the computer usable program code for identifying the set of sub-plans of a query execution plan prior to execution of the query execution plan comprises computer usable program code for determining if estimated statistics for each materialized intermediate result of the set of materialized intermediate results meets a policy, wherein the policy determines when a materialized intermediate result can be used.

5. The computer program product of claim 4, wherein the computer usable program code for determining if the estimated statistics for each materialized intermediate result of the set of materialized intermediate results meets the policy comprises:

computer usable program code for using heuristics to determine if the estimated statistics for each materialized intermediate result meet the policy.

6. The computer program product of claim 4, wherein the computer usable program code for determining if the estimated statistics for each materialized intermediate result meet the policy comprises:

computer usable program code for using a statistical model to determine if the estimated statistics for each materialized intermediate result meet the policy.

7. The computer program product of claim 1, wherein the computer usable program code for optimizing the query execution plan for cost using the useable materialized computed intermediate results to form an optimized query execution plan also re-uses the materialized computed intermediate results.

8. The computer program product of claim 1, wherein the computer usable program code for materializing the set of computed intermediate results to form a set of materialized computed intermediate results comprises:

computer usable program code for placing a materialization point above a table access during query compilation.

9. The computer program product of claim 8, wherein the computer usable program code for obtaining the statistics about the set of materialized computed intermediate results comprises:

computer usable program code for executing a materialization point; and computer usable program code for saving a result of a materialization as a temporary object.

10. The computer program product of claim 9, wherein the computer usable program code for optimizing the query execution plan for cost using the useable materialized computed intermediate results to form an optimized query execution plan comprises:

computer usable program code for optimizing the query execution plan using the temporary object.

11. The computer program product of claim 1, wherein the query is a federated query.

12. The computer program product of claim 11, wherein the set of sub-plans are parts of the federated query that are executed at a remote data source.

13. The computer program product of claim 11, wherein the computer usable program code for materializing the set of computed intermediate results to form a set of materialized computed intermediate results comprises:

computer usable program code for placing a materialization point above an uncorrelated operator during query compilation, wherein the uncorrelated operator is at a point in the query execution plan where intermediate results are communicated between a remote data source and a federated database.

14. The computer program product of claim 13, wherein the computer usable program code for obtaining the statistics from the set of materialized computed intermediate results comprises:

computer usable program code for executing a materialization point;

computer usable program code for saving a result of a materialization as a temporary object; and computer usable program code for triggering query optimization.

15. The computer program product of claim 14, wherein the computer usable program code for optimizing the query execution plan for cost using the useable materialized computed intermediate results to form an optimized query execution plan comprises:

computer usable program code for optimizing the query execution plan using the temporary object.

16. The computer program product of claim 15, wherein the temporary object becomes a persistent object.

17. The computer program product of claim 16, wherein the persistent object is reused in subsequent rounds of query optimization.

18. The computer program product of claim 17, further comprising:

computer usable program code for updating the persistent object.

19. A computer implemented method for query execution through materialization of intermediate results, the computer implemented method comprising:
- identifying a set of sub-plans of a query execution plan prior to execution of the query execution plan, wherein each sub-plan of the set of sub-plans comprises a portion of the query execution plan for which an intermediate result of the sub-plan does not depend on other parts of the query execution plan that have not already been executed;
- computing the set of sub-plans prior to execution of the query execution plan and prior to the computation of the other parts of the query execution plan, wherein computing the set of sub-plans comprises:
  - computing a set of intermediate results for the set of sub-plans to form a set of computed intermediate results;
  - materializing the set of the computed intermediate results to form a set of materialized computed intermediate results;
  - computer usable program code for storing the set of materialized computed intermediate results; and
  - obtaining statistics from the set of the materialized computed intermediate results; and
  - determining, based on the statistics, which materialized computed intermediate results of the set of materialized computed intermediate results are useable to optimize the query execution plan for cost, to form useable materialized computed intermediate results; and
- optimizing the query execution plan for cost using the useable materialized computed intermediate results to form an optimized query execution plan.

20. The computer implemented method of claim 19, further comprising:
executing the optimized query execution plan.

21. The computer implemented method of claim 19, wherein optimizing the query execution plan for cost using the useable materialized computed intermediate results to form an optimized query execution plan exploits the set of materialized intermediate results based on a cost model.

22. The computer implemented method of claim 19, wherein identifying the set of sub-plans of a query execution plan prior to execution of the query execution plan comprises determining if estimated statistics for each materialized intermediate result of the set of materialized intermediate results meet a policy, wherein the policy determines when a materialized intermediate result can be used.

23. The computer implemented method of claim 22, wherein determining if the estimated statistics for each materialized intermediate result of the set of materialized intermediate results meet the policy comprises:
using heuristics to determine if the estimated statistics for each materialized intermediate result meet the policy.

24. The computer implemented method of claim 22, wherein determining if the estimated statistics for each materialized intermediate result of the set of materialized intermediate results meet the policy comprises:
using a statistical model to determine if the estimated statistics for each materialized intermediate result meet the policy.

25. The computer implemented method of claim 19, wherein the step of optimizing the query execution plan for cost using the useable materialized computed intermediate results to form an optimized query execution plan also re-uses the set of materialized computed intermediate results.

26. The computer implemented method of claim 19, wherein materializing the set of computed intermediate results to form a set of materialized computed intermediate results comprises:
placing a materialization point above a table access during query compilation.

27. The computer implemented method of claim 26, wherein obtaining the statistics about the set of materialized computed intermediate results comprises:
executing a materialization point; and
saving a result of a materialization as a temporary object.

28. The computer implemented method of claim 27, wherein optimizing the query execution plan for cost using the useable materialized computed intermediate results to form an optimized query execution plan comprises:
optimizing the query execution plan using the temporary object.

29. The computer implemented method of claim 19, wherein the query is a federated query and wherein the set of sub-plans are parts of the federated query that are executed at a remote data source.

30. A data processing system for predictable query execution through early materialization of intermediate results, the data processing system comprising:
- a storage device, wherein the storage device stores computer usable program code; and
- a processor, wherein the processor executes the computer usable program code to identify a set of sub-plans of a query execution plan prior to execution of the query execution plan, wherein each sub-plan of the set of sub-plans comprises a portion of the query execution plan for which an intermediate result of the sub-plan does not depend on other parts of the query execution plan that have not already been executed; compute the set of sub-plans prior to execution of the query execution plan and prior to the computation of the other parts of the query execution plan, wherein computing the set of sub-plans comprises: computing a set of intermediate results for the set of sub-plans to form a set of computed intermediate results; materializing the set of the computed intermediate results to form a set of materialized computed intermediate results; computer usable program code for storing the set of materialized computed intermediate results; obtaining statistics from the set of the computed materialized intermediate results; and determining, based on the statistics, which materialized computed intermediate results of the set of materialized computed intermediate results are useable to optimize the query execution plan for cost, to form useable materialized computed intermediate results optimize the query execution plan for cost using the useable materialized computed intermediate results to form an optimized query execution plan, exploit the useable materialized intermediate results materialized based on cost; and execute the optimized query execution plan.

* * * * *